United States Patent
Kogure et al.

(10) Patent No.: US 12,170,842 B2
(45) Date of Patent: Dec. 17, 2024

(54) ILLUMINATION CONTROL DEVICE, IMAGING DEVICE, AND STORAGE MEDIUM

(71) Applicant: CANON KABUSHIKI KAISHA, Tokyo (JP)

(72) Inventors: Kentaro Kogure, Tokyo (JP); Shunsuke Chino, Saitama (JP); Seiya Ohta, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/708,026

(22) Filed: Mar. 30, 2022

(65) Prior Publication Data
US 2022/0321764 A1    Oct. 6, 2022

(30) Foreign Application Priority Data

Apr. 5, 2021  (JP) .................................. 2021-064246
Jan. 26, 2022  (JP) .................................. 2022-009795

(51) Int. Cl.
*H04N 5/232*   (2006.01)
*G06T 7/90*   (2017.01)
(Continued)

(52) U.S. Cl.
CPC ............. *H04N 23/661* (2023.01); *G06T 7/90* (2017.01); *H04N 23/56* (2023.01); *H04N 23/84* (2023.01);
(Continued)

(58) Field of Classification Search
CPC ...... H04N 23/661; H04N 23/56; H04N 23/88; H04N 23/84; G06T 7/90
See application file for complete search history.

(56) References Cited

U.S. PATENT DOCUMENTS

2016/0223588 A1* 8/2016 Fox ..................... G01R 31/58
2016/0330386 A1* 11/2016 Sasao ................... H04N 23/667
(Continued)

FOREIGN PATENT DOCUMENTS

| CN | 101374202 A | 2/2009 |
| CN | 105934941 A | 9/2016 |

(Continued)

OTHER PUBLICATIONS

A European Search Report issued on Aug. 1, 2022, which is enclosed, that issued in the corresponding European Patent Application No. 22166279.4.

(Continued)

*Primary Examiner* — Jonathan R Messmore
(74) *Attorney, Agent, or Firm* — Cowan, Liebowitz & Latman, P.C.

(57) ABSTRACT

To realize an illumination control device and the like that can make color reproductivity of an image compatible with an S/N ratio at the time of infrared illumination, the illumination control device includes a visible light measurement unit configured to measure an amount of visible light components; an infrared illumination unit configured to perform infrared illumination; and a control unit configured to cause an intensity of the infrared illumination by the infrared illumination unit to gradually change as the amount of visible light components measured by the visible light measurement unit decreases from a first threshold to a second threshold.

11 Claims, 20 Drawing Sheets

(51) Int. Cl.
*H04N 23/56* (2023.01)
*H04N 23/661* (2023.01)
*H04N 23/84* (2023.01)
*H04N 23/88* (2023.01)

(52) U.S. Cl.
CPC ... *H04N 23/88* (2023.01); *G06T 2207/10024* (2013.01); *G06T 2207/10048* (2013.01)

(56) References Cited

U.S. PATENT DOCUMENTS

| 2018/0055391 | A1* | 3/2018 | Murakami | H04N 23/11 |
| 2019/0364187 | A1* | 11/2019 | Kawasaki | H04N 23/71 |

FOREIGN PATENT DOCUMENTS

| CN | 110536051 A | | 12/2019 |
| JP | 2017-005484 A | | 1/2017 |
| JP | 2017-063362 A | | 3/2017 |
| JP | 2020170966 A | * | 10/2020 |
| KR | 20110015161 A | | 2/2011 |
| KR | 101429510 B1 | * | 8/2014 |

OTHER PUBLICATIONS

A European Office Action issued on Feb. 8, 2024, which is enclosed, that issued in the corresponding European Patent Application No. 22166279.4.

The above foreign patent documents were cited in the Sep. 30, 2024 Chinese Office Action, a copy of which is enclosed with an English Translation, that issued in Chinese Patent Application No. 202210350295.X.

* cited by examiner

FIG. 11

| RANGE OF CHROMINANCE COMPONENT | IRCF | INFRARED ILLUMINATION | IMAGE OUTPUT |
|---|---|---|---|
| RANGE A | INSERTED | OFF | COLOR |
| RANGE B | REMOVED | OFF | COLOR |
| RANGE C | REMOVED | ON (DEPENDING ON VISIBLE LIGHT) | COLOR |
| RANGE D | REMOVED | ON (MAXIMUM) | BLACK-AND-WHITE |

FIG. 15

- ⊙ Automatic switching mode
  - ☑ Link to illumination
- ○ Infrared color mode
- ○ Color mode
- ○ Black-and-white mode

FIG. 16

| EACH MODE | IRCF | INFRARED ILLUMINATION | IMAGE OUTPUT |
|---|---|---|---|
| AUTOMATIC SWITCHING MODE (LINK TO ILLUMINATION) | AUTOMATIC | AUTOMATIC | AUTOMATIC |
| AUTOMATIC SWITCHING MODE | AUTOMATIC | FIXED TO OFF | AUTOMATIC |
| INFRARED COLOR MODE | FIXED TO REMOVAL | FIXED TO OFF | FIXED TO COLOR |
| COLOR MODE | FIXED TO INSERTION | FIXED TO OFF | FIXED TO COLOR |
| BLACK-AND-WHITE MODE | FIXED TO REMOVAL | FIXED TO OFF | FIXED TO BLACK-AND-WHITE |

ILLUMINATION CONTROL DEVICE, IMAGING DEVICE, AND STORAGE MEDIUM

BACKGROUND OF THE INVENTION

Field of the Invention

The present invention relates to an illumination control device, an imaging device, and a storage medium for infrared illumination.

Description of the Related Art

There is a model of surveillance cameras and the like in the related art having a night mode in which imaging is performed with an infrared cut filter (which will be referred to as an IRCF) removed from the imaging optical path in low illumination imaging. Alternatively, in a dark environment with little outside light or illumination, operations of surveillance cameras, surveillance systems, and the like that perform imaging while also using infrared illumination have become widespread. Although visible light illumination may be used together therewith for a similar reason, such visible light illumination may not be able to be used depending on a surveillance target or its installation environment, and thus infrared illumination has been utilized in such a situation.

In the night mode of a general surveillance camera, or the like, a different color from the original color of the subject appears because infrared components are taken out due to the IRCF removed from the imaging optical path, and thus a black-and-white image generated by removing color components from the captured image is mostly output. On the other hand, users desire to identify the color of a subject even in a dark environment with little visible light.

For example, Japanese Patent Laid-Open No. 2017-63362 discloses a technique in which an image is divided into multiple areas and a light source unit is controlled for an area with a predetermined or smaller amount of non-visible light (infrared light). In addition, Japanese Patent Laid-Open No. 2017-5484 discloses a technique to adjust image quality according to proportions of visible light and non-visible light.

However, according to the technical details of Japanese Patent Laid-Open No. 2017-63362, color components of a captured image are not considered when the subject is irradiated with non-visible light, which causes the problem of deterioration in color reproduction of the subject. Furthermore, according to the details of Japanese Patent Laid-Open No. 2017-5484, the color of a subject is not able to be reproduced when the subject is irradiated with non-visible light.

Therefore, the present invention aims to obtain an illumination control device and the like that can enable color reproductivity of images to be compatible with S/N ratios at the time of infrared illumination.

SUMMARY OF THE INVENTION

An aspect of the present invention is an illumination control device comprising at least one processor or circuit configured to function as: a visible light measurement unit configured to measure an amount of visible light components, an infrared illumination unit configured to perform infrared illumination, and a control unit configured to cause an intensity of the infrared illumination by the infrared illumination unit to gradually change as the amount of visible light components measured by the visible light measurement unit decreases from a first threshold to a second threshold.

Further features of the present invention will become apparent from the following description of embodiments with reference to the attached drawings.

BRIEF DESCRIPTION OF THE DRAWINGS

FIG. 11 is a table showing states of an IRCF 501, an infrared illumination unit 100, and an output unit 405 in each of the ranges A to D in the graph of FIG. 10.

FIG. 15 is a diagram illustrating examples of modes each of which can be set by an operation unit 1203 of a client device 1200 according to the third embodiment.

FIG. 16 is a table showing examples of combined states of IRCF, infrared illumination, and image output in each mode of FIG. 15.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

In addition, an example in which a network camera is applied as an imaging device will be described in examples. However, the imaging device includes electronic equipment having an imaging function, such as a digital still camera, a digital movie camera, a smartphone with a camera, a tablet computer with a camera, or an in-vehicle camera.

First Embodiment

First, a configuration and processing of an illumination control device according to a first embodiment will be described with reference to FIGS. 1 to 3.

Figure 1:
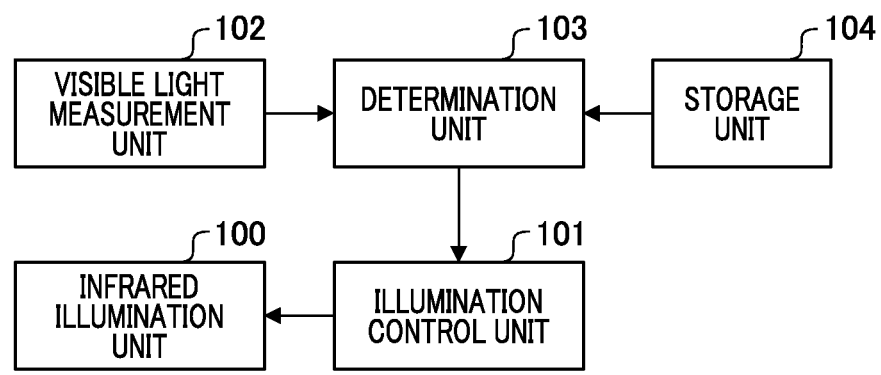
FIG. 1 is a block diagram illustrating a configuration of an illumination control device according to a first embodiment.

FIG. 1 is a block diagram illustrating a configuration of an illumination control device according to the first embodiment. The illumination control device of the present embodiment is used by being combined with a network camera functioning as an example of an imaging device, and includes an infrared illumination unit 100, an illumination control unit 101, a visible light measurement unit 102, a determination unit 103, a storage unit 104, and the like.

The infrared illumination unit 100 emits infrared light (e.g., light with infrared spectral characteristics of about 800 nm to about 1000 nm) to perform infrared illumination. The illumination control unit 101 controls an illumination intensity of the infrared illumination unit 100. The illumination control unit 101 controls various controllable parameters such as a timing at which an illumination intensity is changed, a speed at which an illumination intensity is changed, and illumination resolution, in addition to the illumination intensity of the infrared illumination unit 100.

The visible light measurement unit 102 measures a photographing environment, particularly an amount of visible light components (a visible light intensity) of a subject. The determination unit 103 determines a visible light intensity measured by the visible light measurement unit 102, and the like, and controls an emitted light intensity of the infrared illumination unit 100 via the illumination control unit 101 based on the determination result, and the like.

In addition, the determination unit 103 and the like has a CPU serving as a computer to function as a control section (control unit) that controls operations of each unit of the entire device based on a computer program stored in the storage unit 104. Furthermore, the determination unit 103 transmits control signals to the imaging device. The storage unit 104 stores multiple illumination control patterns provided in advance for the illumination control unit 101 to control intensities of the infrared illumination unit 100, predetermined thresholds used for determination, and the like, in addition to the computer program.

Figure 2:
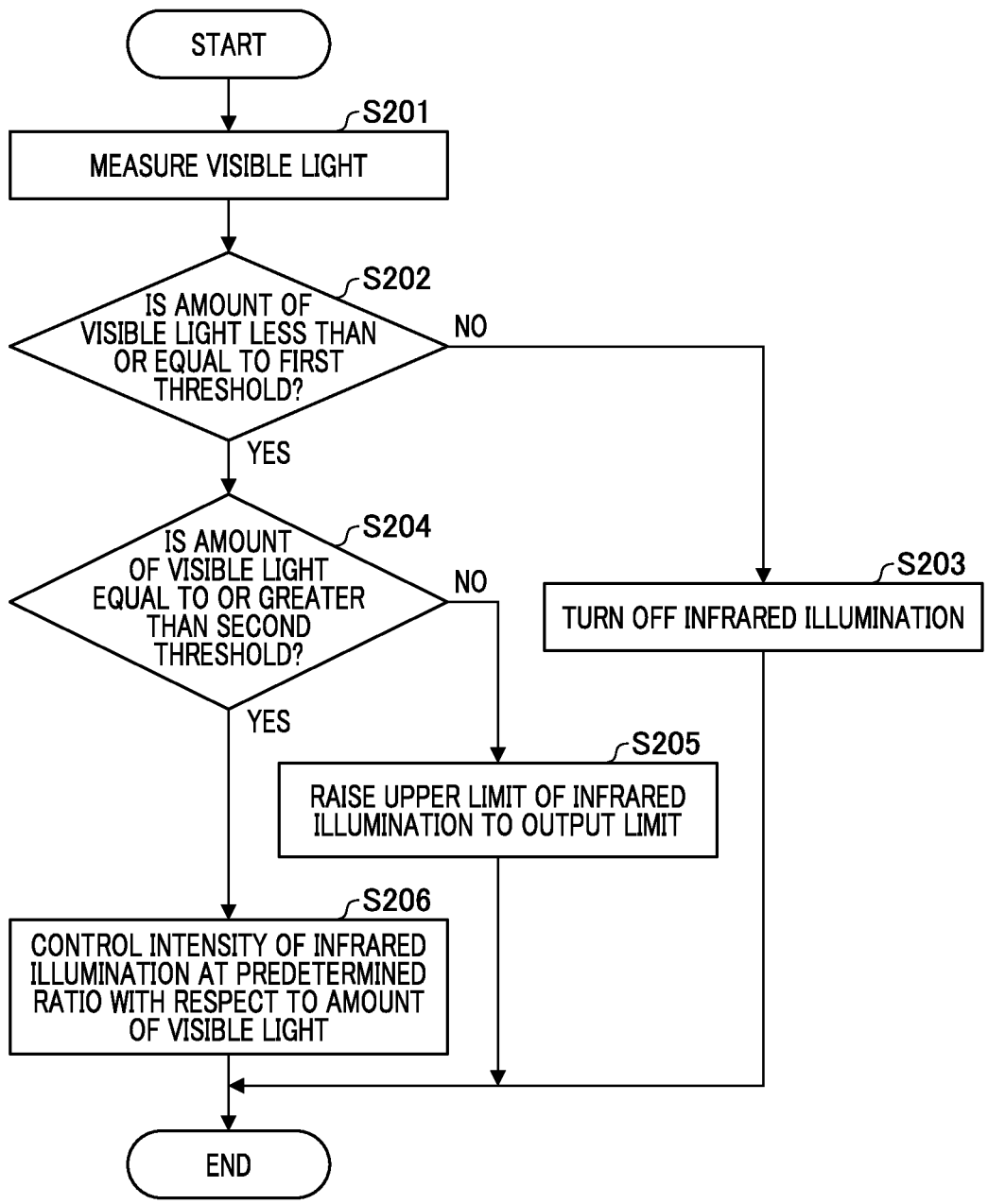
FIG. 2 is a flowchart showing processing of the illumination control device according to the first embodiment.

Next, FIG. 2 is a flowchart showing processing of the illumination control device according to the first embodiment, and the flow of the processing of the illumination control device will be described using the flowchart of FIG. 2. Further, the computer of the determination unit 103 and the like executes the computer program stored in the storage unit 104 to make the operation of each step of FIG. 2 be performed. In addition, it is assumed that an imaging operation of the imaging device is performed during the operation of the flowchart shown in FIG. 2.

First, in step S201, the visible light measurement unit 102 measures the amount of visible light components. The visible light measurement unit measures an illuminance (lux) of an environment using, for example, an illuminance sensor having sensitivity to the wavelength range of visible light. Further, a direction and a range in which the visible light measurement unit 102 performs measurement are set to substantially the same direction or substantially the same range as that of the radiation direction of the infrared illumination unit 100, and the direction and the range include an imaging direction and an imaging range of the imaging lens and the image sensor.

In step S202, the determination unit 103 determines whether the amount of visible light components measured in step S201 is equal to or less than a first threshold.

Here, the first threshold is set to a value equivalent to the predetermined amount of visible light components (brightness), and if the value is equal to or less than the first threshold, it corresponds to the brightness at which, for example, the S/N ratio of the image deteriorates when the imaging device for surveillance is used to take a color picture. In addition, if the value is set to be equal to or less than the first threshold, the infrared cut filter (IRCF) mounted on the imaging optical path of the imaging lens is withdrawn (removed) in the imaging device, and a control signal is transmitted to the imaging device to generate a color image. Further, the first threshold may be arbitrarily set by the user.

If the amount of visible light components is greater than the first threshold, the illumination control unit 101 causes the infrared illumination unit 100 to turn off the illumination (step S203).

If the amount of visible light components is determined to be less than or equal to the first threshold in step S202, the determination unit 103 determines whether the amount of visible light components is equal to or greater than a second threshold in step S204. If the amount of visible light components measured by the visible light measurement unit 102 is less than the second threshold in step S204, the intensity of the infrared illumination is raised to the output limit (upper limit) in step S205, and a control signal is transmitted to the imaging device to generate a black-and-white image. Here, the second threshold is set to a predetermined brightness at which, for example, the subject is not able to be recognized in the image when the imaging device for surveillance takes a color image or color information of the image is not able to be identified. Alternatively, the threshold may be arbitrarily set by the user.

If the answer in step S204 is positive, the processing proceeds to step S206. The illumination control unit 101 performs control in step S206 such that the intensity of the infrared illumination by the infrared illumination unit 100 has a predetermined ratio with respect to the amount of visible light components measured by the visible light measurement unit 102. At this time, various parameters that can be controlled by the illumination control unit 101 such as a timing and a speed at which the illumination intensity is changed, an illumination resolution, and the like may be changed. A detailed control example will be described using FIG. 3.

Figure 3:
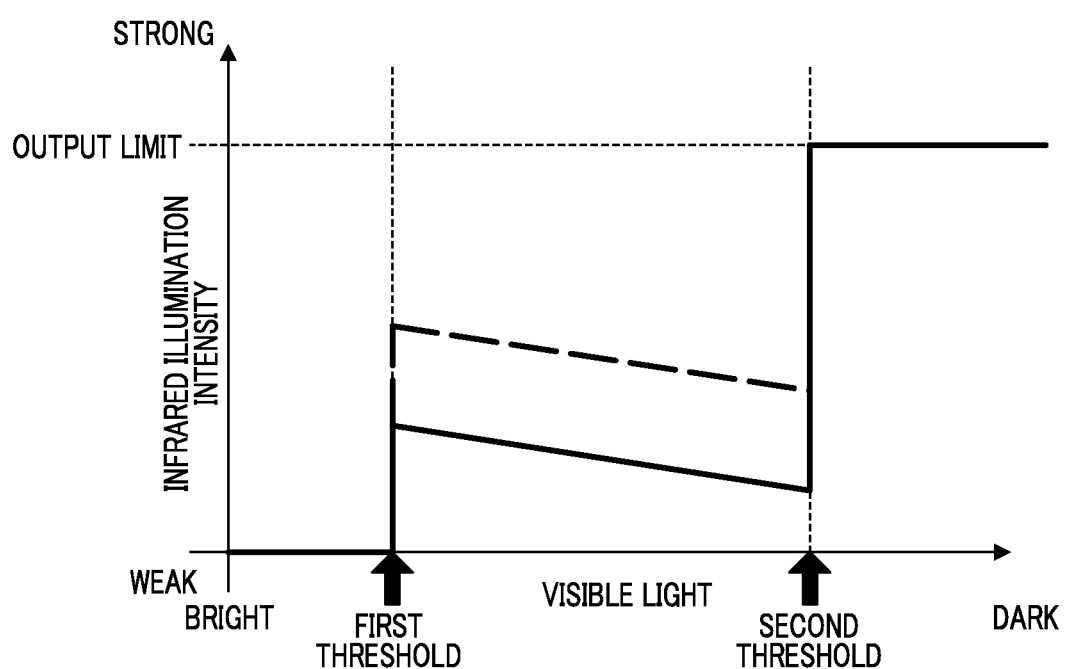
FIG. 3 is a graph showing a relationship between a threshold of visible light and intensities of infrared illumination according to the first embodiment.

Here, FIG. 3 is a graph showing a relationship between the thresholds of visible light and intensities of infrared illumination according to the first embodiment. That is, FIG. 3 shows examples of the first and second thresholds determined by the determination unit 103 in steps S202 and S204 respectively in the flowchart of FIG. 2 and the intensity of the infrared illumination controlled in step S206. In addition, in FIG. 3, the output limit when the illumination control unit 101 performs control in step S205 is represented by a dashed horizontal line. The first threshold is greater than the second threshold. That is, the thresholds have the relationship in which the former has a larger amount of visible light components (the former means brighter). Further, the upper limit of the illumination intensity of the infrared illumination may be changeable.

In addition, the intensity of the infrared illumination by the infrared illumination unit 100 is controlled by the illumination control unit 101 in step S206 such that the intensity gradually decreases as the amount of visible light components becomes smaller (the brightness decreases) between the first threshold and the second threshold. Here, in step S206, the illumination control unit 101 functions as a control unit that causes the intensity of the infrared illumination by the infrared illumination unit to gradually change (decrease) as the amount of visible light components measured by the visible light measurement unit decreases from the first threshold to the second threshold.

That is, control is performed such that the infrared light components and the visible light components are at a substantially constant ratio in step S206. In this case, the relationship in which the amount of infrared light components is greater than the amount of visible light components is desirable. Thus, an image with a balanced S/N ratio and color reproductivity can be obtained. Further, it is desirable to make control be performed such that the saturation of the color image generated by the imaging device is emphasized in the case of an amount of visible light components between the first threshold and the second threshold.

Furthermore, a distance measurement unit may measure the distance to the subject present in the radiation direction of the infrared illumination unit 100 and an offset amount of the intensity of the infrared illumination may be controlled according to the measured distance to the subject. That is, the intensity of the infrared illumination may be offset so as to increase as the distance to the subject increases while the slope of the intensity of the infrared illumination is maintained in the section from the first threshold to the second threshold as indicated by the dashed line in FIG. 3, for example. In addition, the amount of offset may be adjustable by a user while maintaining the characteristics of the slope of the intensity of the infrared illumination in the section from the first threshold to the second threshold.

Furthermore, the output of the infrared illumination unit controlled by the illumination control unit 101 may be corrected according to characteristics of infrared reflected on the subject. For example, the output of the infrared illumination unit controlled by the illumination control unit 101 may be controlled to relatively decrease as reflectance of the subject with respect to infrared increases. In addition, multiple illumination control patterns (patterns in which the intensity of infrared illumination changes in the section from the first threshold to the second threshold) for the illumination control unit 101 may be provided and stored in the storage unit 104 in advance.

In the present embodiment, imaging is performed while changing the intensity of infrared light according to the decrease of the amount of visible light components in the brightness range from the first threshold to the second threshold as described above. Thus, an amount of visible light information (color information) to be acquired can be increased in the brightness range from the first threshold to the second threshold, as compared to a conventional imaging device that uses infrared illumination to merely turn on and off infrared light.

Furthermore, by radiating infrared light at a level lower than the first threshold, the S/N ratio can be improved by infrared sensitivity of the image sensor at a darker level. Thus, color reproductivity of a captured image can be compatible with the S/N ratio. Moreover, balance between the S/N ratio and color reproductivity can be appropriately maintained by performing imaging while lowering the intensity of the infrared light according to the decreased amount of visible light components in the brightness range from the first threshold to the second threshold.

Second Embodiment

Figure 4:
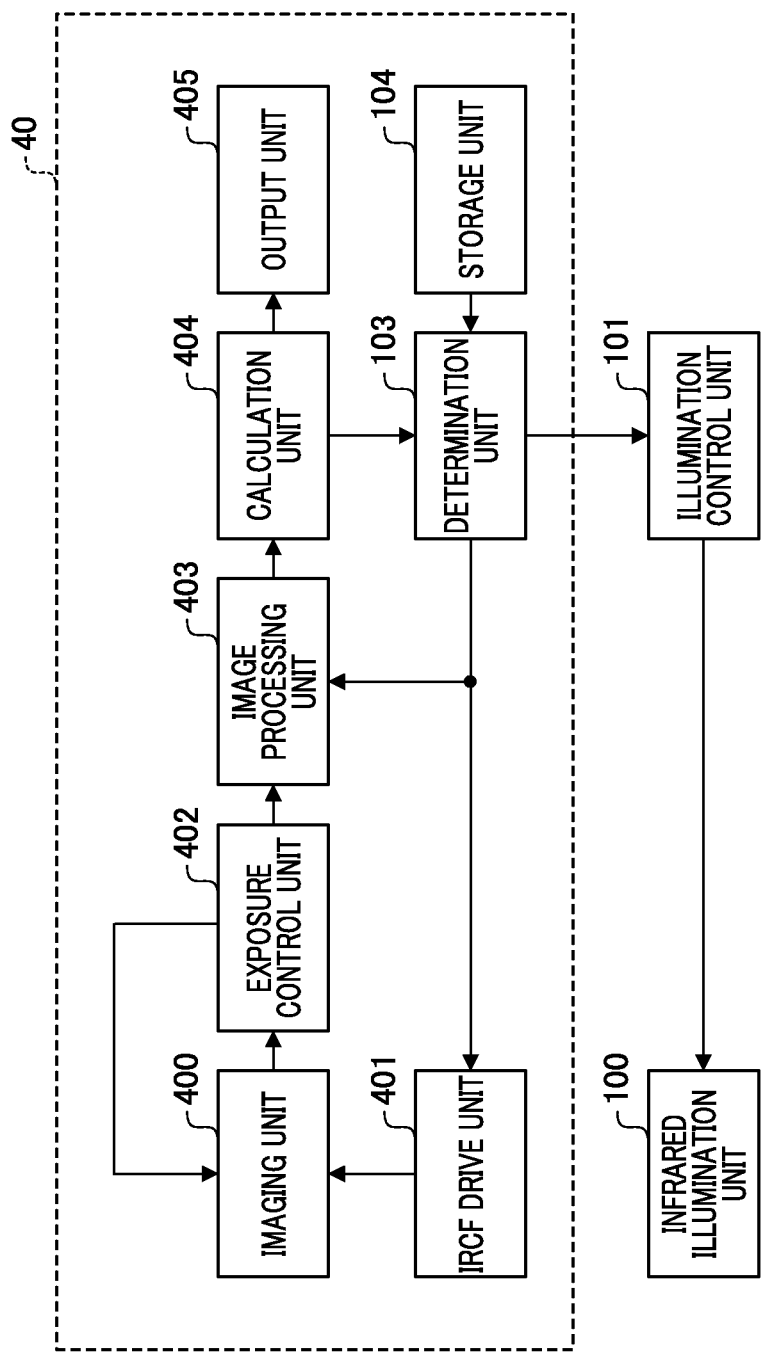
FIG. 4 is a block diagram illustrating a configuration of an imaging device according to a second embodiment.
Figure 5:
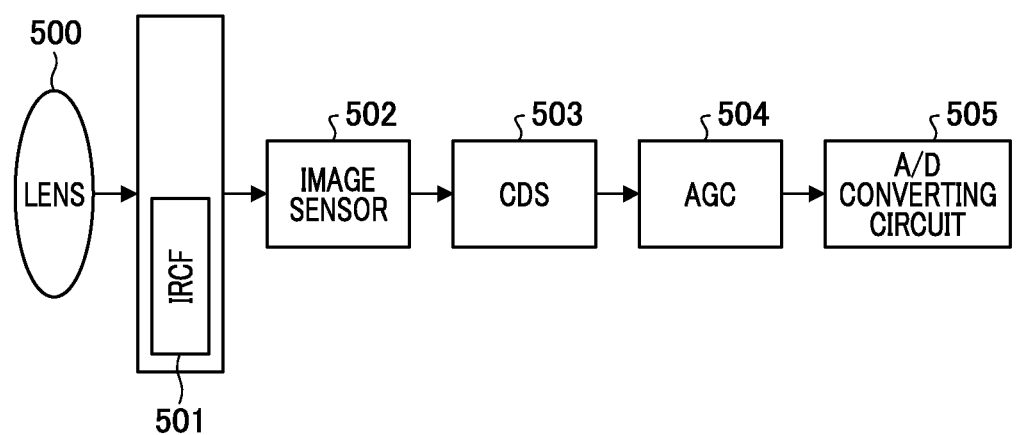
FIG. 5 is a block diagram illustrating a configuration of an imaging unit according to the second embodiment.

A second embodiment will be described below using FIGS. 4 and 5. FIG. 4 is a block diagram illustrating a configuration of an imaging device according to the second embodiment, and FIG. 5 is a block diagram illustrating a configuration of an imaging unit 400 according to the second embodiment.

Description of the constituent components with reference numerals 100 to 104 in FIG. 4 will be omitted because the components perform the same processing as those with the same reference numerals in FIG. 1 described in the first embodiment.

The imaging unit 400 of an imaging device 40 receives light from the outside for imaging. The imaging unit 400 includes an imaging lens 500 composed of a group of multiple lenses including a zoom lens, a focus lens, and the like, an IRCF 501 that can be inserted on/removed from the imaging optical path of the imaging lens 500, and an image sensor 502 such as a CCD or a CMOS.

One of R, G, and B color filters is disposed, for example, before each pixel of the image sensor 502. In addition, the R, G, and B color filters are arrayed in a so-called Bayer array in which R, G, and B filters are alternately disposed in a predetermined cycle. Thus, R, G, and B color signals are periodically read in a predetermined order by sequentially reading the signal of each pixel of the image sensor. In addition, the imaging unit 400 includes a correlated double sampling (CDS) circuit 503 that performs CDS for reducing noise.

Furthermore, the imaging unit 400 includes an automatic gain control (AGC) amplifier 504 that automatically performs gain control on signals obtained from a camera. In addition, the imaging unit 400 includes an A/D converting circuit 505 that converts analog signals into digital signals.

The image sensor 502 converts a subject image formed via the imaging lens 500 serving as an imaging optical system into an electrical signal, and the CDS circuit 503 performs correlated double sampling on the electrical signal output from the image sensor 502. The AGC amplifier 504 performs automatic gain control on the electrical signal output from the CDS circuit 503, and the A/D converting circuit 505 converts the analog signal that has undergone automatic gain control by the AGC amplifier 504 into a digital signal.

An IRCF drive unit 401 moves the IRCF 501 included in the imaging unit 400 in a vertical direction with respect to the imaging optical path of the imaging lens 500 to have the IRCF withdrawn (removed) from or inserted on the imaging optical path. In order to have the same length of the optical path with the IRCF 501 withdrawn (removed) therefrom as that of the optical path when the IRCF 501 is inserted, a glass plate that can transmit light from visible light components to split light of infrared light component or the like may be inserted on the optical path. An exposure control unit 402 controls exposure using an exposure parameter such as an exposure time (accumulation time), a gain, or an aperture value of the image sensor 502 of the imaging unit 400.

The determination unit 103 estimates the brightness (illuminance) of the subject (measures the amount of visible light components) using the exposure amount (the aperture value and exposure time after exposure control), gain, luminance information of the image, and the like using the exposure control unit 402 to determine whether the IRCF 501 has been inserted or removed. That is, in this case, the exposure control unit 402 and the determination unit 103 function as a visible light measurement unit that measures the amount of visible light components based on information acquired from the imaging unit. Then, a control signal is transmitted to the IRCF drive unit 401 according to the determination result to control insertion or removal of the IRCF 501. An image processing unit 403 performs image processing, for example, gamma correction, white balance processing, edge enhancement, saturation adjustment, contrast adjustment, noise reduction processing, and the like on the captured image controlled by the exposure control unit 402.

Here, the determination unit 103 may switch the image to a color image or a black-and-white image using the image processing unit 403 in accordance with control over insertion and/or withdrawal (removal) of the IRCF 501 using the IRCF drive unit 401 and a brightness threshold. That is, the image may be switched to a color image with the IRCF 501 inserted on the imaging optical path and to a black-and-white image with the IRCF 501 withdrawn from the imaging optical path and a brightness (illuminance) below the second threshold.

A calculation unit 404 calculates values of luminance and color components of an image processed by the image processing unit 403. The values include, for example, an average luminance value of the entire image, a chrominance value of each predetermined divided area of the image, and the like. The output unit 405 outputs an image for which values of luminance and color components have been calculated by the calculation unit 404.

The illumination control device with the infrared illumination unit 100 and the illumination control unit 101 may be provided inside the housing of the imaging device 40 or may be provided as a separate body from the housing of the imaging device. In addition, wavelength components of infrared light to be radiated may be in the range from about 800 nm to 1000 nm in which the image sensor 502 has sensitivity thereto.

Figure 6:
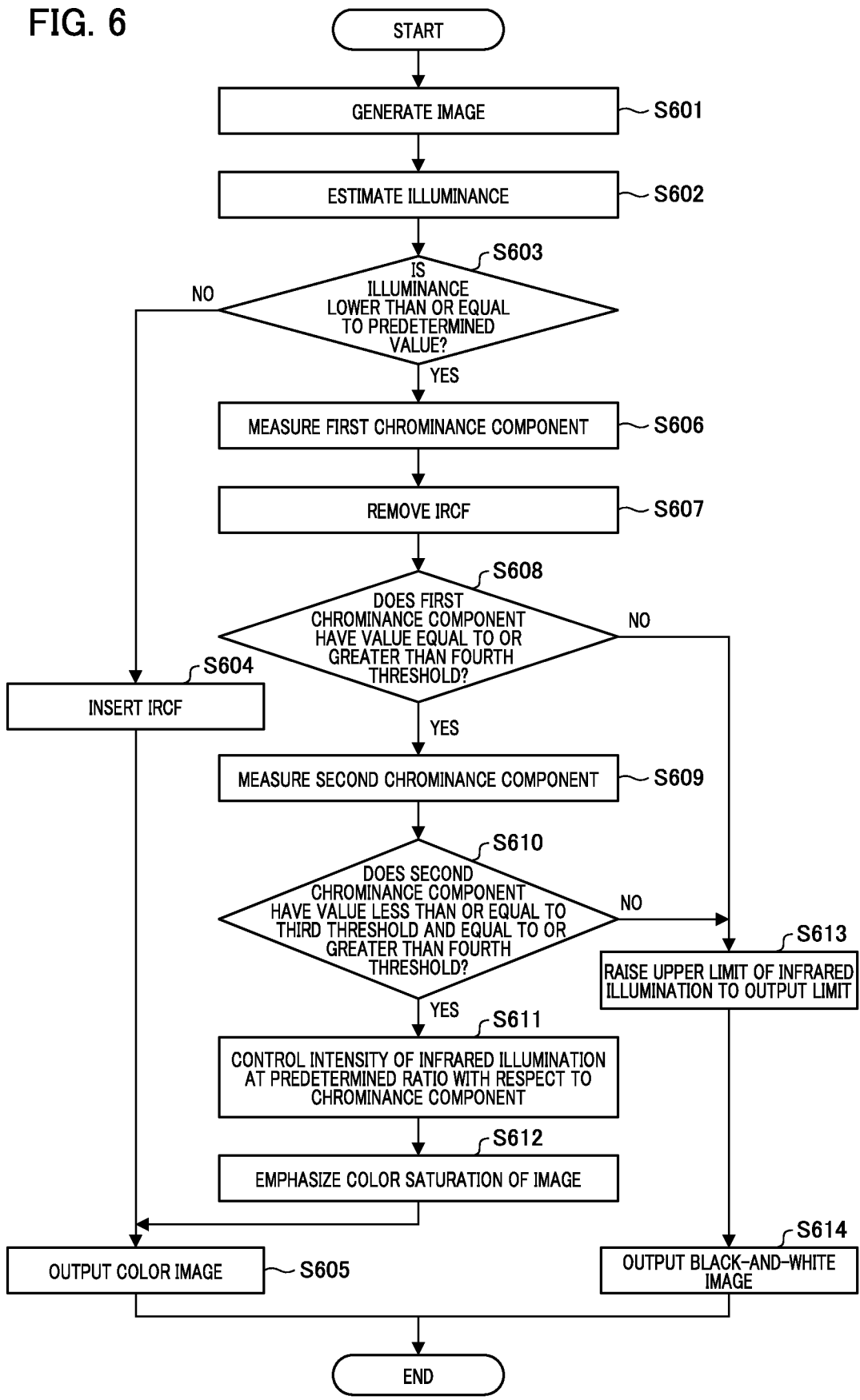
FIG. 6 is a flowchart showing processing of the imaging device according to the second embodiment.

FIG. 6 is a flowchart showing processing of the imaging device according to the second embodiment, and the flow of the processing of the imaging device of FIG. 4 will be described using the flowchart of FIG. 6 with reference to FIG. 4 to FIG. 11. Further, the computer of the determination unit 103 and the like executes the computer program stored in the storage unit 104 to make the operation of each step of FIG. 6 performed.

First, a color image is generated using the imaging unit 400, the exposure control unit 402, and the image processing unit 403 in step S601. The brightness (illuminance) of the subject in the photographing environment is estimated (measured) in step S602. At this time, illuminance may be estimated (measured) based on at least one of the aperture value, exposure time, and gain controlled by the exposure control unit 402, the average luminance value of the image calculated by the calculation unit 404, or the like. Alternatively, illuminance may be measured (estimated) using an illuminance sensor such as a visible light sensor described in the first embodiment.

The determination unit 103 determines whether the illuminance estimated (measured) in step S602 has a predetermined value or lower (step S603). If the determination unit 103 determines that the illuminance has a value greater than the predetermined first threshold in step S603, imaging is performed with the IRCF 501 of the imaging unit 400 inserted on the optical path (step S604). Although normally a color image is output in this case, the image may be in another output format (step S605). On the other hand, if the determination unit 103 determines that the illuminance has a value lower than or equal to the predetermined value (the first threshold) in step S603, a chrominance component (first chrominance component) of the image is measured with the IRCF 501 inserted on the optical path (step S606).

Figure 7:
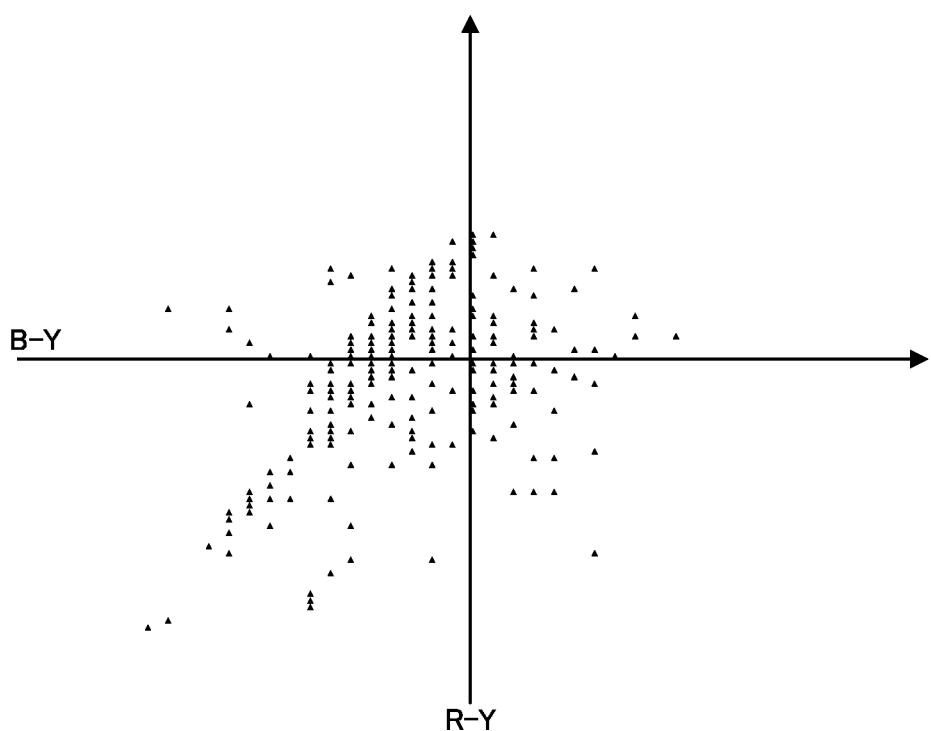
FIG. 7 is a graph of the distribution of chrominance components in an image of a predetermined subject when the amount of visible light is sufficient in the second embodiment.

Here, FIG. 7 is a graph of the distribution of chrominance components in an image of a predetermined subject when the amount of visible light is sufficient in the second embodiment. That is, FIG. 7 is an example of a graph representing the distribution of chrominance (R−Y and B−Y) components for each of areas obtained by dividing an image of the imaging unit 400 capturing a predetermined subject into N areas vertically and M areas horizontally with the IRCF 501 inserted on the optical path in a bright photographing environment with a sufficient amount of visible light. The vertical axis is an R−Y axis, and the horizontal axis is a B−Y axis.

Figure 8:
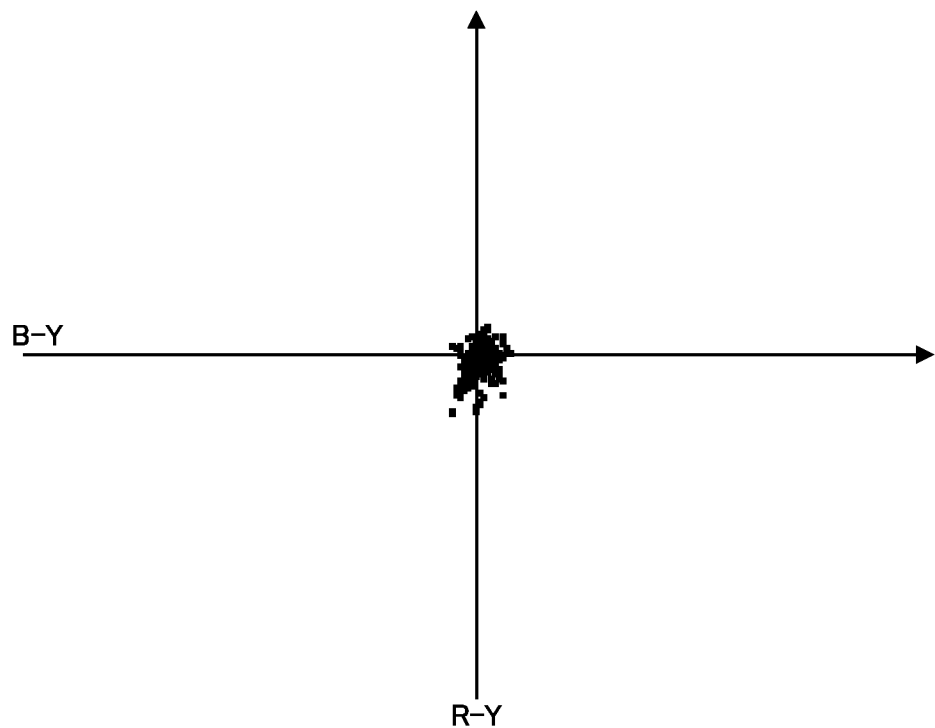
FIG. 8 is a graph of the distribution of chrominance components in an image of a predetermined subject in the condition that the intensity of infrared illumination is dominant over that of visible light in the second embodiment.

Meanwhile, FIG. 8 is a graph of the distribution of chrominance components in an image of a predetermined subject in the condition that the illumination intensity of infrared light is dominant with respect to visible light in the second embodiment. That is, FIG. 8 is a graph representing the distribution of chrominance components of an image of the imaging unit 400 capturing the same subject as in FIG. 7 with the IRCF 501 withdrawn (removed) from the imaging optical path in the condition that the intensity of infrared illumination is dominant over that of visible light.

Figure 9:
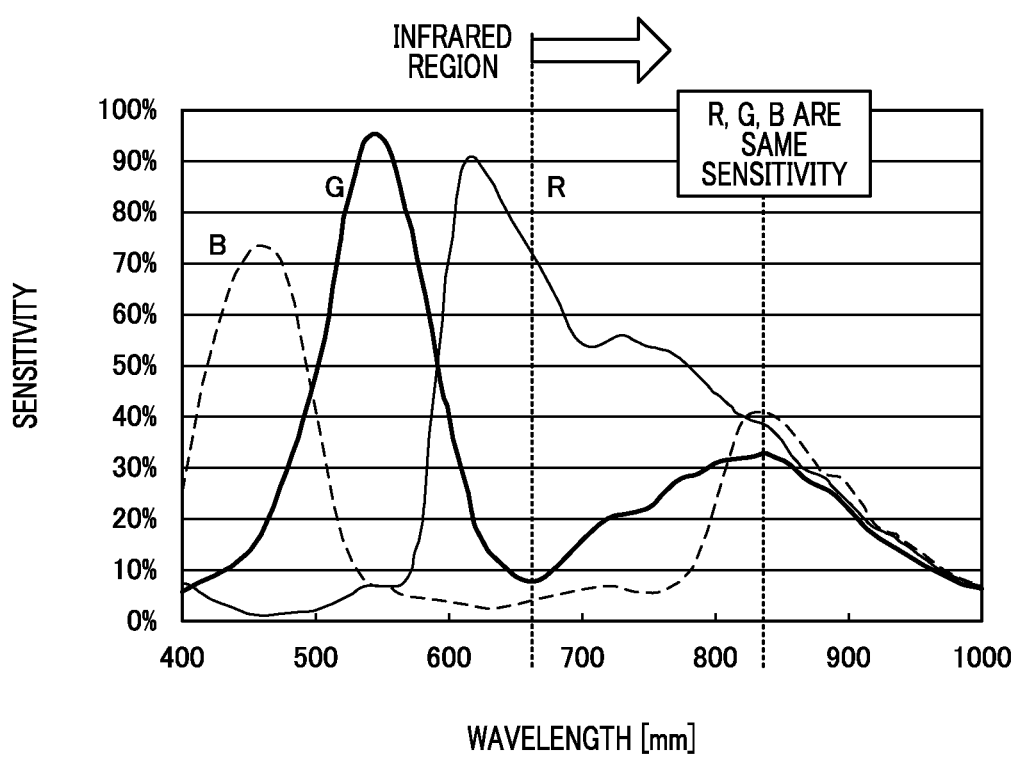
FIG. 9 is a graph showing spectral sensitivity of a general color image sensor according to the second embodiment.

While chrominance components are uniformly distributed in FIG. 7, they are converged on a local area around the center in FIG. 8. The reason for this is that, in terms of spectral sensitivity characteristics of a general image sensor as shown in FIG. 9, the image sensor has substantially the same sensitivity regardless of colors with longer wavelengths than about 800 nm. Further, FIG. 9 is a graph showing spectral sensitivity of a general color image sensor according to the second embodiment.

That is, distribution of chrominance components is more likely to be concentrated around the center as infrared has a greater intensity than visible light, and thus the amount of chrominance components tends to decrease (an achromatic image is generated). A relative intensity of the infrared illumination to the visible light components can be estimated with the IRCF 501 of the imaging unit 400 removed from the optical path based on characteristics of change in chrominance components of the image with respect to a change in a proportion (ratio) of the intensity of infrared components with respect to that of visible light components.

Further, there are various known techniques of estimating a proportion of infrared components with respect to visible light components from chrominance components of an image, and other known techniques may be used.

After the first chrominance component is measured with the IRCF 501 inserted in step S606, the IRCF 501 is withdrawn (removed) from the optical path using the IRCF drive unit 401 in step S607. Further, the chrominance component (first chrominance component) measured in step S606 may be, for example, the average value of R−Y and B−Y obtained from the multiple divided areas of the picture, or the like.

Then, in step S608, the determination unit 103 determines whether the first chrominance component measured in step S606 has a value equal to or greater than a fourth threshold.

Here, the fourth threshold is a chrominance value corresponding to a predetermined brightness (the second threshold in the first embodiment) at which, for example, the subject is not able to be recognized in the image obtained from color photographing by the imaging device 40 or the color information is not able to be identified from the image. Further, the fourth threshold may be arbitrarily set by the user. Alternatively, the fourth threshold may be a chrominance component value of about the color identification limit of a color identifier or the eyes of a person when the saturation is emphasized in step S612 which will be described below.

If the first chrominance component is determined to have a value less than the fourth threshold in step S608, the upper limit of the infrared illumination is raised to the output upper limit (step S613). At this time, the illumination control unit 101 does not need to forcedly control the intensity of the infrared illumination unit 100 to the output upper limit. In addition, the upper limit of the intensity of the illumination may be changeable according to subject conditions such as the distance to the subject, reflection characteristics of the subject, and the influence of a shielding object.

In addition, it can be estimated that the subject itself is almost achromatic based on the fact that the amount of chrominance components in the image when the IRCF 501 is inserted is small (the image is substantially achromatic), and thus a black-and-white image is output by putting priority on the S/N ratio (step S614). On the other hand, if the first chrominance component has a value equal to or greater than the fourth threshold in step S608, the calculation unit 404 calculates (measures) the chrominance component (second chrominance component) while the IRCF 501 is withdrawn (removed) from the optical path in step S609.

Further, the chrominance component (second chrominance component) measured in step S609 may be, for example, the average value of R–Y and B–Y obtained from the multiple divided areas of the picture, or the like. Then, in step S610, the determination unit 103 determines whether the second chrominance component calculated in step S609 has a value less than or equal to the third threshold and equal to or greater than the fourth threshold.

Here, the third threshold is a chrominance value corresponding to a brightness (the first threshold in the first embodiment) at which the S/N ratio of the image deteriorates when the imaging device for surveillance is used to take a color picture, for example, if the second chrominance component has a value less than or equal to the third threshold. In addition, if the second chrominance component has a value less than or equal to the third threshold, the generation of a color image continues although the IRCF 501 is withdrawn (removed) from the imaging optical path. Further, the third threshold may be arbitrarily set by the user. Furthermore, the third and fourth thresholds may be respectively corrected according to the amount of the first chrominance component while the IRCF 501 is inserted. For example, as the amount of the first chrominance component increases, the fourth threshold may decrease. The reason for this is that it is considered that the saturation of the subject is originally high in such a case.

If the second chrominance component is determined to have a value greater than the third threshold and less than the fourth threshold in step S610, the upper limit of the infrared illumination is raised to the output upper limit by putting priority on sensitivity (step S613). Then, a black-and-white image is output by putting priority on the S/N ratio (step S614).

Figure 10:
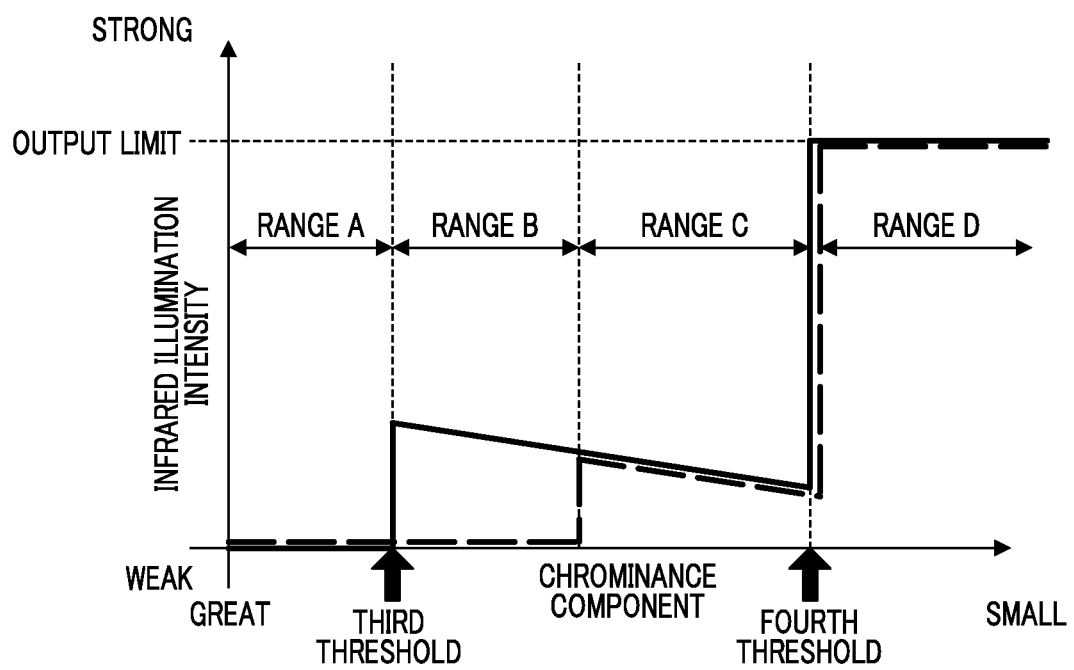
FIG. 10 is a graph showing a relationship between thresholds of visible light and intensities of infrared illumination according to the second embodiment.

On the other hand, if the answer to step S610 is determined to be positive, the intensity of the illumination of the infrared illumination unit 100 is controlled such that it is indicated by the solid line between the third threshold and the fourth threshold of FIG. 10 according to the second chrominance component (step S611).

Here, FIG. 10 is a graph showing a relationship between thresholds of visible light and intensities of infrared illumination according to the second embodiment. In addition, FIG. 11 is a table showing states of the IRCF 501, the infrared illumination unit 100, and the output unit 405 in each of the ranges A to D in the graph of FIG. 10.

Further, at this time, the control pattern in which the timing at which the infrared illumination unit 100 starts radiation shifts in the direction in which the amount of chrominance component decreases as indicated by the dashed line in FIG. 10 while maintaining the slope of a partial solid line portion may be stored in the storage unit 104 in advance and the control pattern may be used. Here, the control pattern indicated by the dashed line is an example of a control pattern in which color reproductivity is more important than the S/N ratio, compared to the control pattern indicated by the solid line.

Furthermore, as another control pattern, the intensity of the infrared illumination may be controlled such that it goes upward to the right in the range B of FIG. 10. In this case, color reproductivity is improved. Those control patterns and the control pattern in which the S/N ratio is more important than color reproductivity (the pattern indicated by the solid line of FIG. 10) are stored in the storage unit 104 in advance. Which control pattern will be used may be selected by the user. In addition, the third and fourth thresholds of FIG. 10 may each be adjusted by the user. Furthermore, the amount of offset may be adjustable by the user while maintaining the characteristics of the slope of the intensity of the infrared illumination in the ranges B and C.

Moreover, because the tone of the image tends to be weak due to the irradiation with the infrared illumination in the present embodiment, the color saturation of the image is emphasized by the image processing unit 403 (step S612). Then, the illumination control unit 101 emphasizes the color saturation of the image while performing control over the intensity of the illumination of the infrared illumination unit 100 at a predetermined slope in the section between the third threshold and the fourth threshold of FIG. 10 in steps S611 and 612, and outputs the image as a color image in step S605.

When a subject is captured with the imaging device in which the IRCF can be inserted or removed and the intensity of infrared illumination can be controlled, the amount of visible light information (color information) acquired can be more increased than in the related art, particularly in the chrominance range from the third threshold to the fourth threshold also in the second embodiment as described above.

Furthermore, if infrared light is radiated at the level at which the chrominance has a value lower than the third threshold, the S/N ratio can be improved by the sensitivity of the image sensor to infrared at a relatively dark level. Thus, color reproductivity and the S/N ratio of the captured image can be maintained.

Third Embodiment

Figure 12:
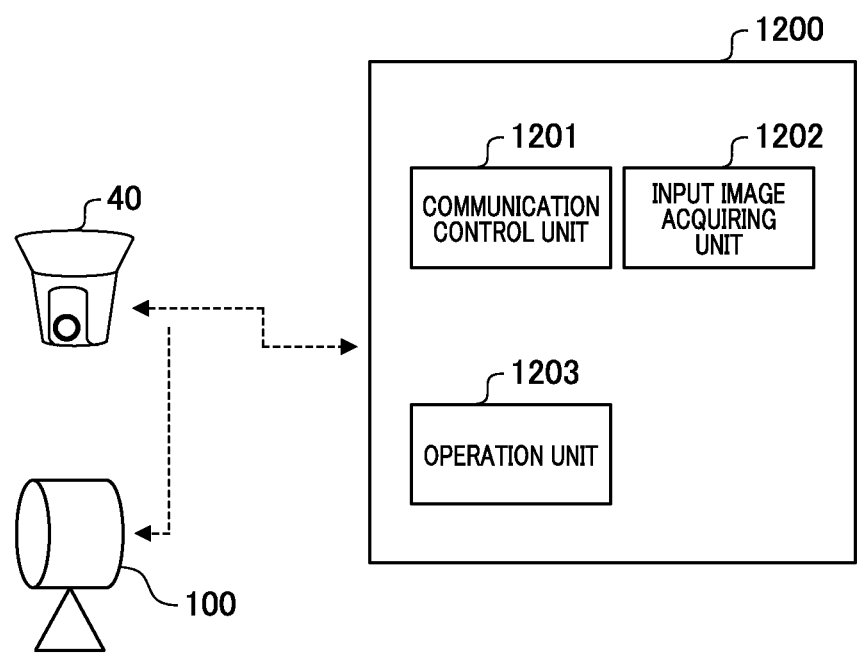
FIG. 12 is a block diagram illustrating a configuration of an imaging system according to a third embodiment.

FIG. 12 is a block diagram illustrating a configuration of an imaging system according to a third embodiment. Because configurations of the imaging device 40 and the infrared illumination unit 100 in FIG. 12 perform similar processing to that described in FIG. 4, respectively, description thereof will be omitted. Reference numeral 1200 in FIG. 12 represents a client device having at least a communication control unit 1201, an input image acquiring unit 1202, and an operation unit 1203. In addition, the client device 1200 may include a configuration of a general versatile personal computer, which is not illustrated.

The communication control unit 1201 in FIG. 12 controls various types of communication when the client device 1200 is connected to the imaging device 40 directly or via a network. In addition, the imaging device 40 has a communication unit, which is not illustrated, as a communication section to enable communication with the communication control unit 1201. Furthermore, the communication control unit 1201 may directly communicate with the infrared illumination unit 100 or may communicate with the infrared illumination unit 100 via the imaging device 40. For example, the communication control unit 1201 may transmit, to the imaging device 40, a command for causing an instruction on each processing operation of the imaging device 40 to be executed, and the communication unit of the imaging device 40 receives the command via the network from the outside and applies it to each processing operation following details thereof.

The input image acquiring unit 1202 in FIG. 12 acquires an image output from the imaging device 40 and causes a display unit, which is not illustrated, to display the image, for example. The operation unit 1203 in FIG. 12 generates and changes each command to be transmitted to the imaging device 40 on a graphical user interface (GUI) displayed on the display unit, which is not illustrated.

Figure 13:
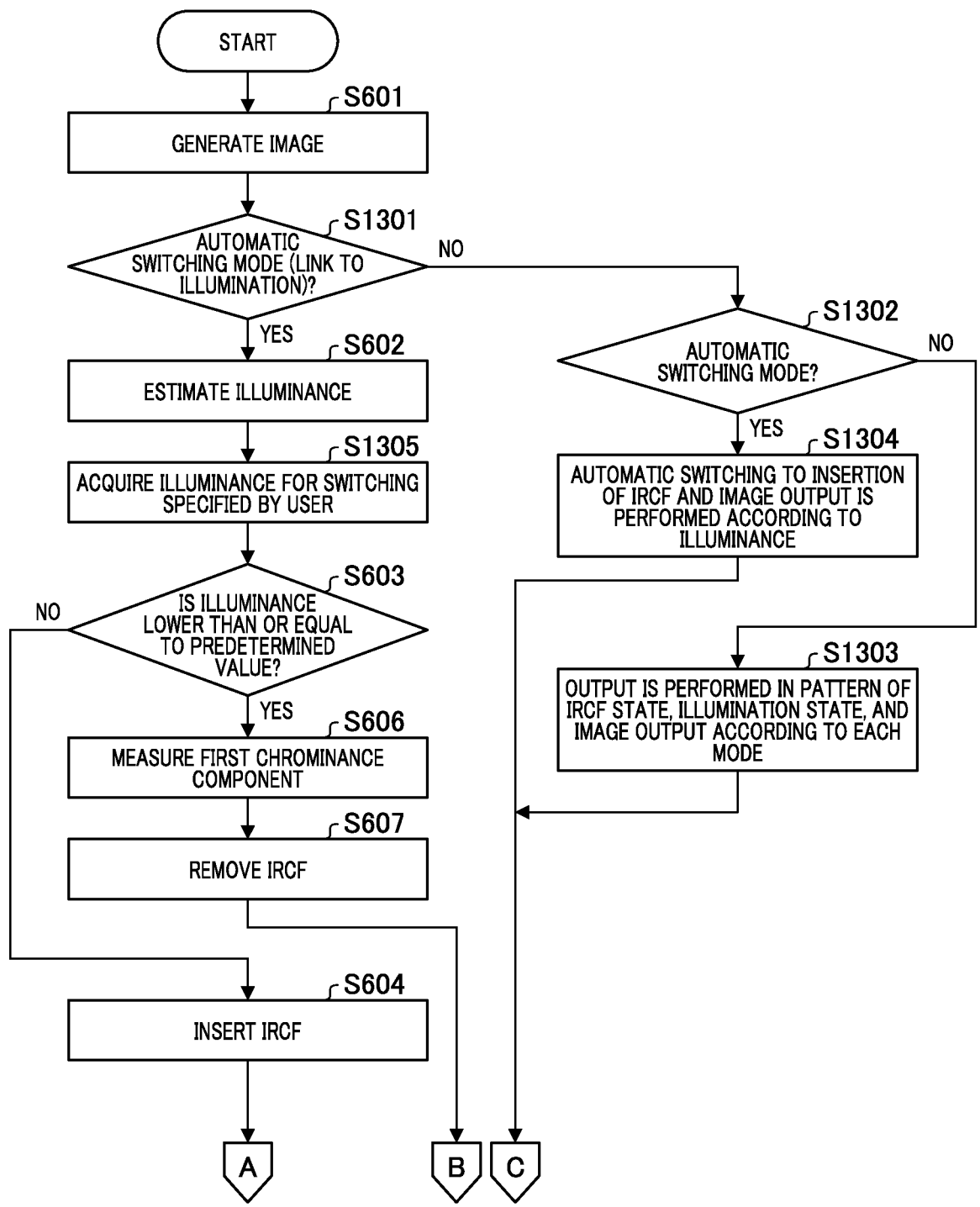
FIG. 13 is a flowchart showing processing of the imaging system according to the third embodiment.
Figure 14:
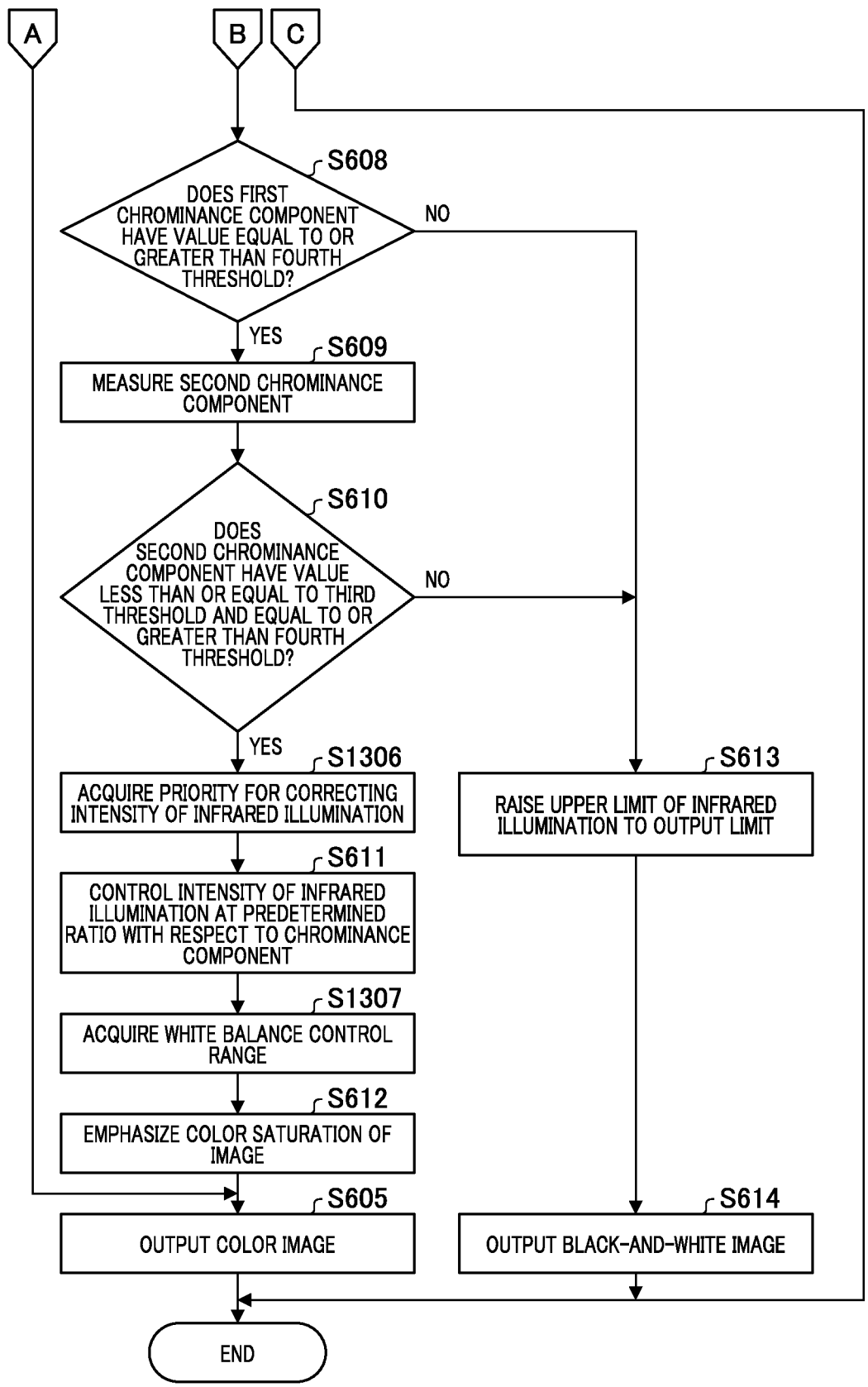
FIG. 14 is a flowchart showing the other part of the processing of the imaging system according to the third embodiment.

FIG. 13 is a flowchart showing processing of the imaging system according to the third embodiment, and FIG. 14 is a flowchart showing the other part of the processing of the imaging system according to the third embodiment. The flow of the processing of the imaging device of FIG. 4 will be described using the flowcharts of FIGS. 13 and 14 with reference to FIGS. 4 to 20. Further, a computer such as the determination unit 103 or the like executes a computer program stored in the storage unit 104, a program for controlling each unit of the client device 1200, and the like to make the operation of each step of FIGS. 13 and 14 performed.

In addition, because each of steps S601 to S614 of the flowchart of FIGS. 13 and 14 represents similar processing to that of the same steps of the flowchart in FIG. 6 described in the second embodiment, description thereof will be omitted.

In step S1301, it is determined whether the current mode is "automatic switching mode (link to illumination)". Here, FIG. 15 is a diagram illustrating examples of modes each of which can set by the operation unit 1203 of the client device 1200 according to the third embodiment.

In the example of FIG. 15, a user can select any one mode from "automatic switching mode," "infrared color mode," "color mode," and "black-and-white mode." In addition, when "automatic switching mode" is selected, the mode can be switched to "link to illumination" by clicking the checkbox of "linked to illumination" for selecting whether the mode is to be linked to infrared illumination. Further, FIG. 16 is a table showing examples of combined states of IRCF, infrared illumination, and image output in each mode of FIG. 15. In the present embodiment, multiple modes with different combinations of a control state of infrared illumination, an insertion/removal state of an infrared cut filter on/from the imaging optical path of the imaging lens, and an image output state are stored as in the drawing and the modes are selectable.

If "automatic switching mode (link to illumination)" is not selected in step S1301, it is determined whether "automatic switching mode" has been selected (step S1302).

If it is not determined that "automatic switching mode" has been selected in step S1302, any of "infrared color mode," "color mode," and "black-and-white mode" has been selected. Thus, an output is performed in a pattern in which IRCF, infrared illumination, and image output are combined according to each mode of FIG. 16 (step S1303).

On the other hand, if it is determined that "automatic switching mode" has been selected in step S1302, automatic switching to insertion/removal of the IRCF and image output is performed according to the illuminance (step S1304). Automatic insertion and removal of the IRCF is performed according to the illuminance of the photographing environment such that a color image is output with the IRCF inserted when the illuminance is brighter than that of a predetermined threshold and infrared components may be taken in by removing the IRCF when the illuminance is darker than that of the predetermined threshold. Furthermore, the image output with the IRCF removed may be a black-and-white or color image. After the processing of steps S1303 and S1304 is executed, the flow of FIGS. 13 and 14 ends.

Figure 17:
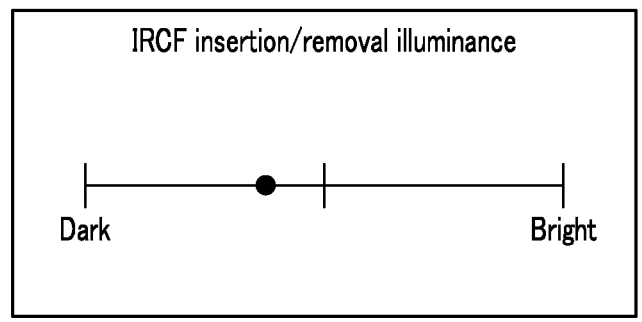
FIG. 17 is a diagram illustrating an example of a GUI on which illumination is set when the IRCF is automatically inserted or removed according to the third embodiment.

If "automatic switching mode (link to illumination)" has been selected in step S1301, the illuminance is estimated in step S602, and then the illuminance for IRCF switching specified by the user on the GUI as illustrated in FIG. 17 is acquired (step S1305). FIG. 17 is a diagram illustrating an example of a GUI on which illuminance is set to automatically insert or remove the IRCF according to the third embodiment, and the brightness for IRCF insertion/removal can be set to become lower to the left and higher to the right. That is, in the present embodiment, a brightness at which the infrared cut filter is inserted or withdrawn (removed) is selectable by a user.

Figure 18:
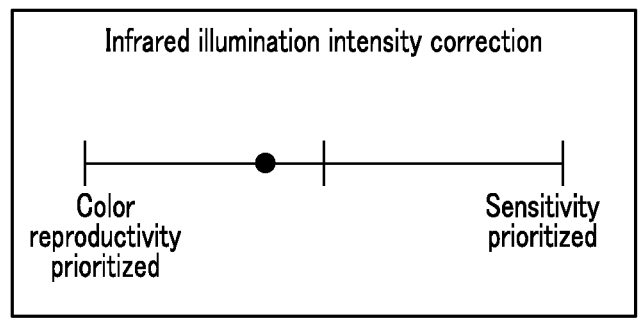
FIG. 18 is a diagram illustrating an example of a GUI on which a priority is set when an illumination intensity is corrected in automatic adjustment of infrared illumination according to the third embodiment.

Next, after passing step S603 to step S610, the priority for correcting the intensity of the infrared illumination specified by the user on the GUI illustrated in FIG. 18 is acquired (step S1306). FIG. 18 is a diagram illustrating an example of a GUI on which a priority is set when an illumination intensity is corrected in automatic adjustment of infrared illumination according to the third embodiment. In FIG. 18, the infrared illumination is set to become weaker to the left to prioritize color reproductivity and infrared illumination is set to become stronger to the right to prioritize sensitivity.

Specifically, in a case where color reproductivity is prioritized on the GUI of FIG. 18 at the intensity of the infrared illumination in the ranges B and C in the graph of FIG. 10 according to the second embodiment, the intensity of the infrared illumination in the ranges B and C is corrected to become weaker (e.g., the curve indicated by the dashed line). In addition, in a case where sensitivity is prioritized, the intensity of the infrared illumination in the ranges B and C can be corrected to become stronger (e.g., the curve indicated by the solid line). That is, in the present embodiment, an intensity of infrared illumination is correctable according to the priority set by a user.

Figure 19:
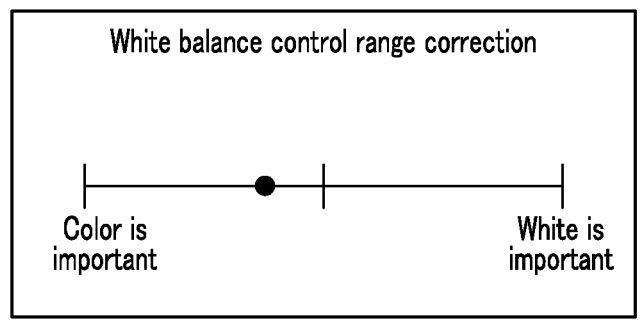
FIG. 19 is a diagram illustrating an example of a GUI on which a priority of a white balance control range is set according to the third embodiment.

Next, after passing step S611, a white balance control range specified by the user on the GUI illustrated in FIG. 19 is acquired (step S1307). FIG. 19 is a diagram illustrating an example of a GUI on which a priority of a white balance control range is set according to the third embodiment. In FIG. 19, the white balance control range can be set to become narrower as the GUI slides to the left to regard color as more important, and become wider as the GUI slides to the right to regard white as more important.

Figure 20:
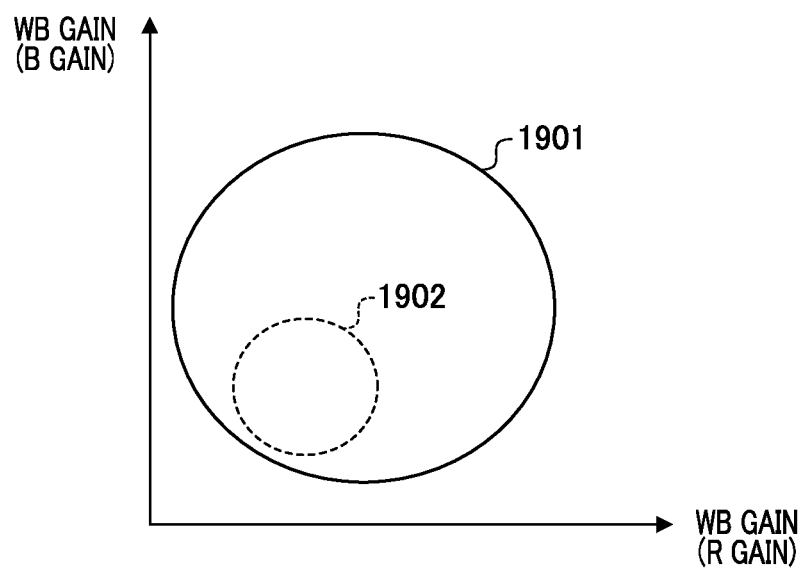
FIG. 20 is a graph showing an example of a white balance control range set in FIG. 19 according to the third embodiment.

Specifically, when general auto-white balance control is performed, the white balance processing control range by the image processing unit 403 is changed as shown in the graph of FIG. 20. FIG. 20 is a graph showing an example of a white balance control range set in FIG. 19 according to the third embodiment. In FIG. 20, in a case where the white balance control range is set to be wider, white balance gains (R gain and B gain) are controlled with the range of 1901, for example. In addition, in a case where the white balance control range is set to be narrower, the white balance gains are controlled in the range of 1902, for example.

Further, according to the above description, the image processing unit 403 functions as a white balance control section, and the user can select a white balance control range on the GUI of FIG. 19 using the white balance control section. That is, the imaging device 40 can receive a command from the outside via a network and control at least one of the intensity of infrared illumination, insertion/removal of the infrared cut filter on/from the imaging optical path of the imaging lens, and white balance.

In the third embodiment, an amount of visible light information (color information) acquired can be increased particularly in the chrominance range from the third threshold to the fourth threshold as described above, and an image can be output while further reflecting the image quality preferred by the user therein.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to this embodiment, a computer program realizing the function of the embodiment described above may be supplied to the illumination control device through a network or various storage media. Then, a computer (or a CPU, an MPU, or the like) of the illumination control device may be configured to read and execute the program. In such a case, the program and the storage medium storing the program configure the present invention.

This application claims the benefit of Japanese Patent Application No. 2021-064246 filed on Apr. 5, 2021, and Japanese Patent Application No. 2022-009795 filed on Jan. 26, 2022, both of which are hereby incorporated by reference herein in its entirety.

What is claimed is:

1. An imaging device having a lens and an image sensor, the imaging device comprising:
    an infrared cut filter that is inserted on or removed from an imaging optical path of the lens;
    a visible light sensor that measures an amount of visible light components based on information acquired from the image sensor;
    an infrared illumination apparatus that irradiates infrared light, wherein the intensity of the infrared illumination by the infrared illumination apparatus is corrected according to characteristics of reflected infrared light;
    at least one processor; and
    a memory coupled to the at least one processor, the memory storing instructions that, when executed by the at least one processor, cause the at least one processor to cause an intensity of the infrared illumination by the infrared illumination apparatus to gradually change as the amount of visible light components measured by the visible light sensor decreases from a first threshold to a second threshold,
    wherein, if the amount of visible light components is less than or equal to the first threshold, the infrared cut filter is removed from the imaging optical path,
    wherein the instructions further cause the at least one processor to:
    calculate a chrominance component from an image acquired from the image sensor;
    calculate a first chrominance component from the image with the infrared cut filter inserted on the imaging optical path;
    calculate a second chrominance component from the image with the infrared cut filter removed from the imaging optical path;
    wherein, if the second chrominance component is less than or equal to a third threshold that is greater than a fourth threshold and if the first chrominance component and the second chrominance component are equal to or greater than the fourth threshold, the instructions further cause the at least one processor to cause the intensity of the infrared illumination by the infrared illumination apparatus to decrease as the amount of visible light components decreases.

2. The imaging device according to claim 1, wherein the visible light sensor measures the amount of visible light components from at least one of an amount of exposure of the image sensor, luminance information of an image acquired from the image sensor, and a gain of the image sensor.

3. The imaging device according to claim 1, wherein a color image is generated with the infrared cut filter inserted on the imaging optical path, and the color image or a black-and-white image is generated according to the first chrominance component, the second chrominance component, and the intensity of the infrared illumination radiated by the infrared illumination apparatus with the infrared cut filter removed from the imaging optical path.

4. The imaging device according to claim 3 wherein, if the first chrominance component or the second chrominance component is less than the fourth threshold, the intensity of the infrared illumination apparatus is raised to an output upper limit.

5. The imaging device according to claim 1, wherein multiple modes with different combinations of a control state of the infrared illumination, an insertion/removal state of the infrared cut filter on/from the imaging optical path of the imaging lens, and an image output state are stored and the modes are selectable.

6. A control method of controlling an imaging device having a lens, an image sensor and an infrared cut filter that is inserted on or removed from an imaging optical path of the lens, the method comprising:
    measuring an amount of visible light components by a visible light sensor, based on information acquired from the image sensor;
    irradiating infrared light by an infrared illumination apparatus, wherein the intensity of the infrared illumination by the infrared illumination apparatus is corrected according to characteristics of reflected infrared light;
    causing an intensity of infrared illumination performed by infrared illumination apparatus to gradually change as the amount of visible light components measured in the measuring decreases from a first threshold to a second threshold, wherein, if the amount of visible light components is less than or equal to the first threshold, the infrared cut filter is removed from an imaging optical path, wherein the method further comprises:

calculating a chrominance component from an image acquired from the image sensor;

calculating a first chrominance component from the image with the infrared cut filter inserted on the imaging optical path; and calculating a second chrominance component from the image with the infrared cut filter removed from the imaging optical path;

wherein, if the second chrominance component is less than or equal to a third threshold that is greater than a fourth threshold and if the first chrominance component and the second chrominance component are equal to or greater than the fourth threshold, causing the intensity of the infrared illumination by the infrared illumination apparatus to decrease as the amount of visible light components decreases.

7. A non-transitory computer-readable storage medium storing a program for executing a control method of controlling an imaging device having a lens, an image sensor and an infrared cut filter that is inserted on or removed from an imaging optical path of the lens, the method, the control method comprising:

measuring an amount of visible light components by a visible light sensor, based on information acquired from the image sensor;

irradiating infrared light by an infrared illumination apparatus, wherein the intensity of the infrared illumination by the infrared illumination apparatus is corrected according to characteristics of reflected infrared light;

causing an intensity of infrared illumination performed by infrared illumination apparatus to gradually change as the amount of visible light components measured in the measuring decreases from a first threshold to a second threshold, wherein, if the amount of visible light components is less than or equal to the first threshold, the infrared cut filter is removed from an imaging optical path, wherein the method further comprises:

calculating a chrominance component from an image acquired from the image sensor;

calculating a first chrominance component from the image with the infrared cut filter inserted on the imaging optical path; and calculating a second chrominance component from the image with the infrared cut filter removed from the imaging optical path;

wherein, if the second chrominance component is less than or equal to a third threshold that is greater than a fourth threshold and if the first chrominance component and the second chrominance component are equal to or greater than the fourth threshold, causing the intensity of the infrared illumination by the infrared illumination apparatus to decrease as the amount of visible light components decreases.

8. The illumination control device according to claim 1, wherein
the amount of visible light components measured by the visible light sensor is a visible light intensity of a subject.

9. The illumination control device according to claim 1, wherein, if the amount of visible light components measured by the visible light sensor is less than the second threshold, the at least one processor causes the intensity of illumination by the infrared illumination apparatus to be raised to an upper limit.

10. The illumination control device according to claim 1, wherein, if the amount of visible light components measured by the visible light sensor is greater than the first threshold, the at least one processor controls the infrared illumination apparatus to stop irradiating infrared light.

11. The illumination control device according to claim 1, wherein the at least one processor controls to maintain a changing ratio of the intensity of the infrared illumination, if the amount of visible light components measured by the visible light sensor is in a brightness range from the first threshold to the second threshold.

* * * * *